(12) United States Patent
Lv et al.

(10) Patent No.: US 11,788,642 B2
(45) Date of Patent: Oct. 17, 2023

(54) ELECTRIC VALVE AND MANUFACTURING METHOD THEREFOR

(71) Applicant: Zhejiang Sanhua Climate and Appliance Controls Group Co., Ltd, Zhejiang (CN)

(72) Inventors: Ming Lv, Shaoxing (CN); Jiancheng Zhi, Shaoxing (CN); Damai Yang, Shaoxing (CN)

(73) Assignee: Zhejiang Sanhua Commercial Refrigeration Controls Co., Ltd., Shaoxing (CN)

( * ) Notice: Subject to any disclaimer, the term of this patent is extended or adjusted under 35 U.S.C. 154(b) by 457 days.

(21) Appl. No.: 16/961,631

(22) PCT Filed: May 17, 2018

(86) PCT No.: PCT/CN2018/087275
§ 371 (c)(1),
(2) Date: Jul. 10, 2020

(87) PCT Pub. No.: WO2019/148692
PCT Pub. Date: Aug. 8, 2019

(65) Prior Publication Data
US 2020/0340596 A1  Oct. 29, 2020

(30) Foreign Application Priority Data

Jan. 31, 2018  (CN) .......................... 201810094300.9

(51) Int. Cl.
*F16K 31/04* (2006.01)
*F16K 1/36* (2006.01)
(Continued)

(52) U.S. Cl.
CPC .............. *F16K 31/047* (2013.01); *F16K 1/36* (2013.01); *F16K 1/42* (2013.01); *F16K 31/50* (2013.01); *F16K 1/02* (2013.01); *F16K 31/508* (2013.01)

(58) Field of Classification Search
CPC ...... F16K 31/047; F16K 31/50; F16K 31/508; F16K 31/36; F16K 31/42; F16K 1/36;
(Continued)

(56) References Cited

U.S. PATENT DOCUMENTS 6,460,567 B1 * 10/2002 Hansen, III ............. F16K 31/04
137/625.48
2004/0256586 A1 * 12/2004 Denning ............... F16K 39/022
251/66

(Continued)

FOREIGN PATENT DOCUMENTS

CN        1789768 A     6/2006
CN     101294634 A    10/2008
(Continued)

OTHER PUBLICATIONS

International Search Report and Written Opinion for International Application No. PCT/CN2018/087275, dated Nov. 2, 2018.
(Continued)

*Primary Examiner* — Patrick C Williams
(74) *Attorney, Agent, or Firm* — Wolf, Greenfield & Sacks, P.C.

(57) ABSTRACT

An electric valve and manufacturing method therefor, the electric valve including a valve body part, a valve seat part, a transmission part and a valve core part, wherein the valve core part includes a valve core body and a lower stop part; the valve core body is essentially tubular, and the valve core body is of an integrated structure and includes an annular thin wall portion; the lower stop part is arranged in an inner
(Continued)

cavity of the valve core body, and the lower stop part comprises a lower stop portion; an upper cavity is present above the lower stop portion, a lower cavity is present below the lower stop portion, and the lower stop part includes a first axial through hole which is in communication with the upper cavity and the lower cavity.

16 Claims, 13 Drawing Sheets

(51) Int. Cl.
    *F16K 1/42*    (2006.01)
    *F16K 31/50*   (2006.01)
    *F16K 1/02*    (2006.01)
(58) Field of Classification Search
    CPC ..... F16K 1/42; F16K 1/02; F16K 1/46; F16K 25/005; B21D 22/00; B29C 45/0055; B29L 2001/005
    See application file for complete search history.

(56) References Cited

U.S. PATENT DOCUMENTS

2010/0181514 A1    7/2010    Ohuchi
2015/0316168 A1*   11/2015   Lv ............................ F16K 27/02
                                                        251/129.01
2016/0341336 A1*   11/2016   Harada ................... F25B 41/35

FOREIGN PATENT DOCUMENTS

| CN | 101788073 A | 7/2010 |
| CN | 105090534 A | 11/2015 |
| EP | 1 725 270 A1 | 4/2014 |
| JP | 2001-050415 A | 2/2001 |
| JP | 2003-148643 A | 5/2003 |
| JP | 2009-168050 A | 7/2009 |
| JP | 2013-130271 A | 7/2013 |
| JP | 2014-518361 A | 7/2014 |
| JP | 2017-203509 A | 11/2017 |

OTHER PUBLICATIONS

Office Action for Japanese Application No. 2020-539039, dated Sep. 21, 2021.
PCT/CN2018/087275, Nov. 2, 2018, International Search Report and Written Opinion.
JP2020-539039, Sep. 21, 2021, Office Action.

* cited by examiner

ELECTRIC VALVE AND MANUFACTURING METHOD THEREFOR

The present application is a national stage entry under 35 U.S.C. § 371 of International Application No. PCT/CN2018/087275, titled "ELECTRIC VALVE AND MANUFACTURING METHOD THEREFOR", filed on May 17, 2018, which claims the priority to Chinese patent application No. 201810094300.9, titled "ELECTRIC VALVE AND MANUFACTURING METHOD THEREFOR", filed with the China National Intellectual Property Administration on Jan. 31, 2018. The contents of each of these applications are incorporated herein by reference in their entirety.

FIELD

The present application relates to the technical field of fluid control, and in particular to an electric valve and a manufacturing method therefor.

BACKGROUND

In some air conditioners, especially the commercial air-conditioning systems such as the variable refrigerant flow system, one outdoor unit is required to be connected with multiple indoor units; therefore, an electric control valve is required to be mounted in a refrigerant loop of each indoor unit for cutting off the refrigerant or regulating the flow. At present, the action performance requirements of the electric valve are getting higher and higher. Therefore, those skilled in the art continuously devote to improving the action performance of the electric valve.

SUMMARY

An object of the present application is to provide an electric valve capable of improving the action performance of the valve.

The electric valve disclosed according to the present application includes:
  a valve body component including a valve body, wherein the valve body includes a first fluid port;
  a valve seat component fixedly connected to the valve body component and including a valve seat body, wherein the valve seat body includes a second fluid port;
  a transmission component arranged in a valve chamber of the electric valve and including a screw rod and a screw nut, wherein the screw rod is in threaded connection with the screw nut;
  a valve core component arranged in the valve chamber and including a valve core body and a lower stop component;
  wherein the valve core body is substantially tubular, the valve core body has an integral structure, and the valve core body includes an annular thin-walled portion; the lower stop component is provided in an inner chamber of the valve core body, the lower stop component includes a lower stop portion, an upper chamber is located above the lower stop portion, and a lower chamber is located below the lower stop portion, and the lower stop component includes a first axial through hole communicating with the upper chamber and the lower chamber; and
  the screw nut includes a radial protrusion located in the upper chamber, the radial protrusion can cooperate with an upper stop portion of the valve core component, and the screw nut can drive the valve core component to move upward in an axial direction; the annular thin-walled portion can abut against or be separated from a sealing portion of the valve seat component, and the lower stop portion can cooperate with a lower end portion of the screw nut.

According to the electric valve provided by the present application, the valve core component includes the valve core body and the lower stop component, the valve core body is substantially tubular, the valve core body has an integral structure, and the valve core body includes the annular thin-walled portion; the lower stop component is provided in the inner chamber of the valve core body, the lower stop component includes the lower stop portion, the upper chamber is located above the lower stop portion, and the lower chamber is located below the lower stop portion, and the lower stop component includes the first axial through hole communicating with the upper chamber and the lower chamber, which can improve the action performance of the valve.

A method for manufacturing the electric valve with the above functions is further provided according to the present application, which includes the following steps:
  S1: providing a hollow valve core body with an integral structure, wherein the valve core body includes a diameter-reduced section, a large-diameter section, and a transition section between the diameter-reduced section and the large-diameter section;
  S2: providing a valve seat core with a sealing portion and a valve seat body and a valve port jacket made of metal materials, wherein an upper end surface of the valve seat body is provided with an upper stepped portion with a stepped surface facing upward for mounting the valve seat core; mounting the valve seat core on the upper stepped portion and crimping an upper end of the valve seat body to the valve seat core; and fixing an outer wall of the valve port jacket to the valve seat body by welding;
  S3: providing a guide sleeve, and fixing the guide sleeve to the valve body by welding to form a first assembly;
  S4: provide a screw nut, a sealing assembly, an elastic member and a lower stop component, sleeving the sealing assembly on an outer peripheral portion of a diameter-reduced section, and crimping an upper end of the diameter-reduced section to the sealing assembly; inserting the screw nut into an inner chamber of the valve core body and extending a threaded connection end of the screw nut out of the valve core body so that a radial protrusion of the screw nut is position-limited by a transition section; mounting the lower stop component into the inner chamber after mounting the elastic member, and then fixing the lower stop component to the valve core body by welding to form a second assembly;
  S5: assembling the second assembly with the first assembly from bottom to top, so that the screw nut is in threaded connection with the screw rod; and
  S6: fixing the valve body to the valve seat body by welding.

Another method for manufacturing the electric valve with the above functions is further provided according to the present application, which includes the following steps:
  S1: providing a hollow valve core body with an integral structure;
  S2: providing a valve seat core with a sealing portion and a valve seat body and a valve port jacket made of metal materials, wherein an upper end surface of the valve seat body is provided with an upper stepped portion with a stepped surface facing upward for mounting the valve seat core; mounting the valve seat core on the upper stepped portion and crimping an upper end of the valve seat body to the valve seat core, and fixing an outer wall of the valve port jacket to the valve seat body by welding;

S3: providing a guide sleeve and a sealing assembly, wherein the guide sleeve includes a guide section and an installation section, an inner wall of the installation section and an inner wall of the guide section form a second positioning stepped portion with a stepped surface facing downward; and fixing a lower end of the installation section to a ring-shaped lower position-limiting member by crimping or welding, after the sealing assembly is mounted on the second positioning stepped portion;

S4: fixing the guide sleeve to the valve body by welding to form a first assembly after the step S3;

S5: providing a screw nut, an elastic member and a lower stop component, wherein the lower stop component includes a support member and a stop member; inserting the screw nut into an inner chamber of the valve core body and extending a threaded connection end of the screw nut out of the valve core body, so that a radial protrusion of the screw nut is position-limited to the valve core body, then assembling the elastic member with the screw nut, then mounting the stop member with a first axial through hole into the inner chamber of the valve core body, then mounting the support member therein, and then fixing the support member to the valve core body by welding to form a second assembly;

S6: assembling the second assembly with the first assembly from bottom to top, so that the screw nut is in threaded connection with the screw rod; and S7: fixing the valve body to the valve seat body by welding.

BRIEF DESCRIPTION OF THE DRAWINGS

In order to illustrate technical solutions in the embodiments of the present application or in the conventional technology more clearly, drawings used in the description of the embodiments or the conventional technology are introduced briefly hereinafter. Apparently, the drawings described hereinafter merely illustrate some embodiments of the present application, and other drawings may be obtained by those skilled in the art based on these drawings without any creative efforts.

DETAILED DESCRIPTION OF THE EMBODIMENTS

Figure 1:
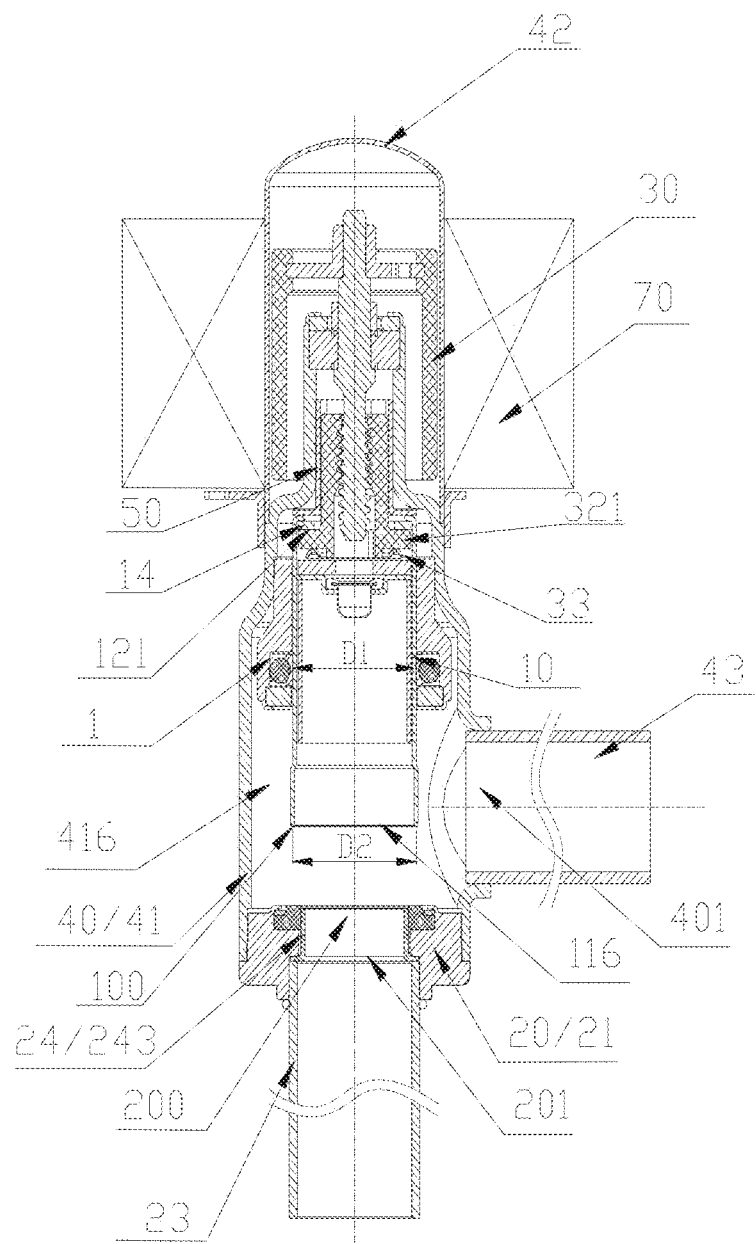
FIG. 1 is a schematic structural view of an electric valve according to a first embodiment of the present application in a fully open state.

In order to provide those skilled in the art with a better understanding of the solutions of the present application, the present application will be described hereinafter in further detail in conjunction with the drawings and specific embodiments.

It should be noted that, the orientation terms, such as up and down, involved in this application are defined with the components being located at the positions shown in the drawings of the application, which are only for clarity and ease of describing the technical solutions. It will be appreciated that, those orientation terms used herein do not limit the protection scope of the present application.

The "axial direction" herein refers to a direction from top to bottom or bottom to top with reference to the paper surface, which is equivalent to the axial direction of the rotor and the valve core guiding component. The term "radial direction" herein refers to a direction perpendicular to the aforementioned axial direction. The "opening the valve port" herein means that fluid at the valve port is flowable between the axial connecting pipe and the radial connecting pipe, and the "closing the valve port" means that fluid at the valve port is not flowable between the axial connecting pipe and the radial connecting pipe. It should be noted that the "integrated" herein means that one part is formed by a single piece, not by assembling or fixing two or more pieces together. The "thin-walled" herein means that the wall thickness is between 0.3 mm and 2.0 mm, that is, if the wall thickness is defined as M, then $0.3\ mm \leq M \leq 2.0\ mm$.

The "fixedly connected" herein refers to that two components may be directly fixedly connected, or two components may be fixedly connected by other components, that is, two components are indirectly fixedly connected.

Figure 2:
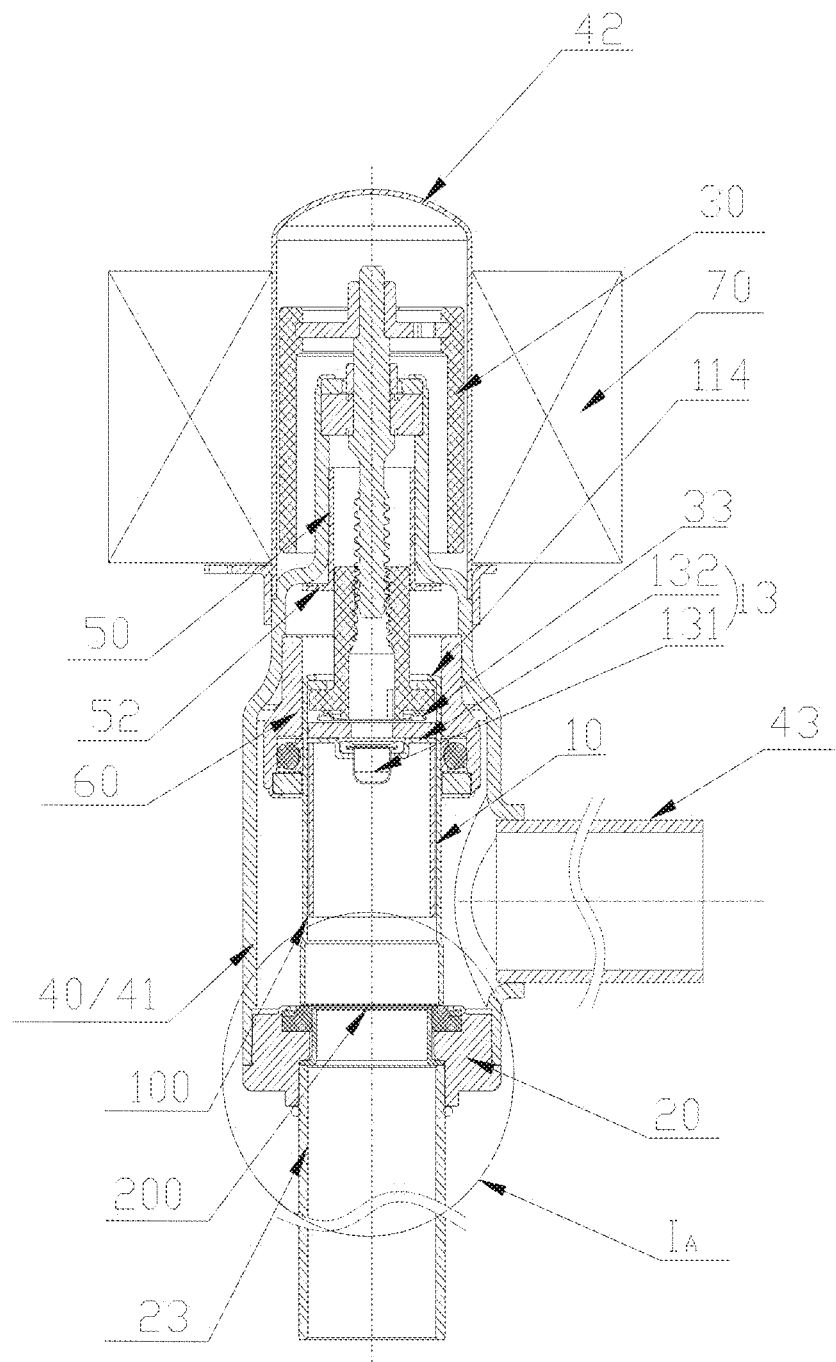
FIG. 2 is a schematic structural view of the electric valve according to the first embodiment of the present application in a fully closed state.
Figure 3:
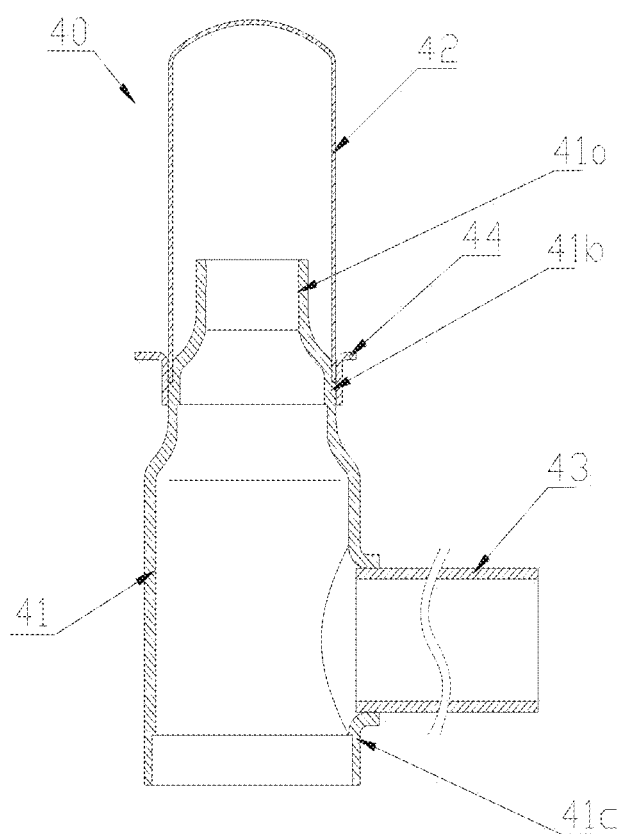
FIG. 3 is a schematic structural view of a valve body component of the electric valve shown in FIG. 1.
Figure 4:
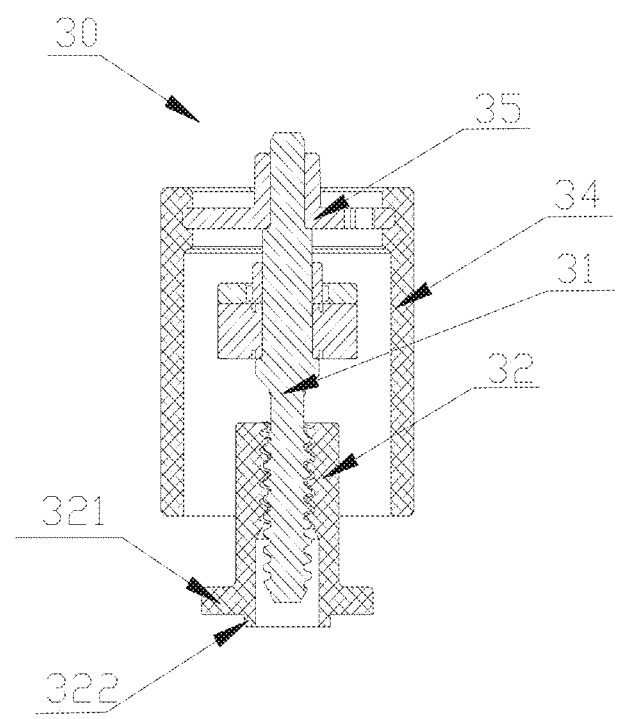
FIG. 4 is a schematic structural view of a transmission component of the electric valve shown in FIG. 1.
Figure 5:
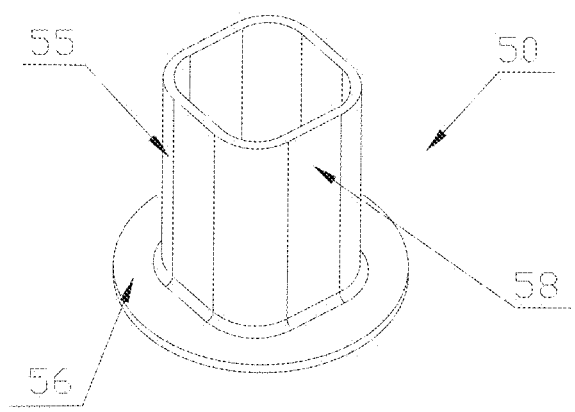
FIG. 5 is a schematic perspective view of a screw nut kit of the electric valve shown in FIG. 1.
Figure 6:
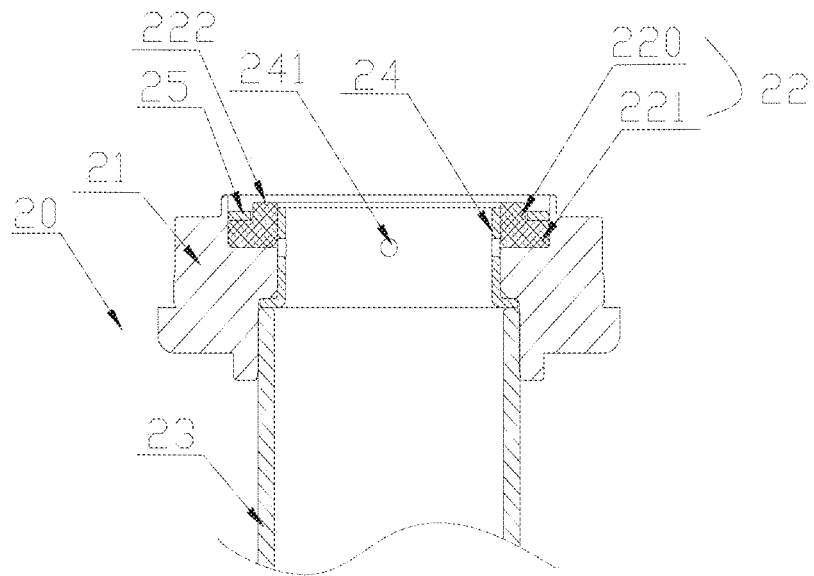
FIG. 6 is a schematic structural view of a valve seat component of the electric valve shown in FIG. 1 after being fixed to an axial connecting pipe.
Figure 7:
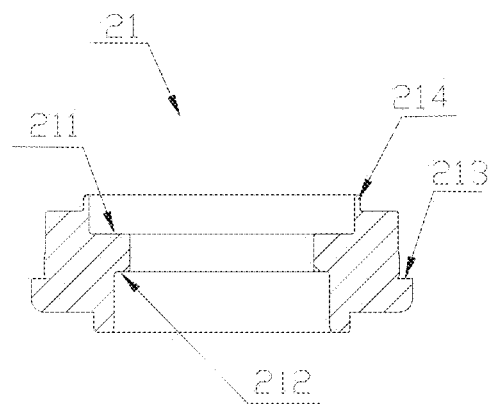
FIG. 7 is a schematic structural view of a valve seat body of the electric valve shown in FIG. 1.
Figure 8:
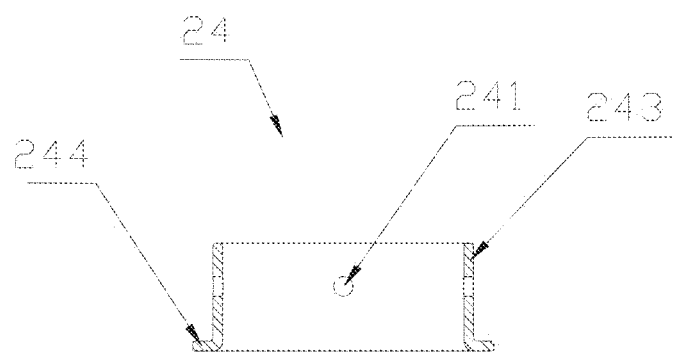
FIG. 8 is a schematic structural view of a valve core jacket shown in FIG. 1.
Figure 9A:
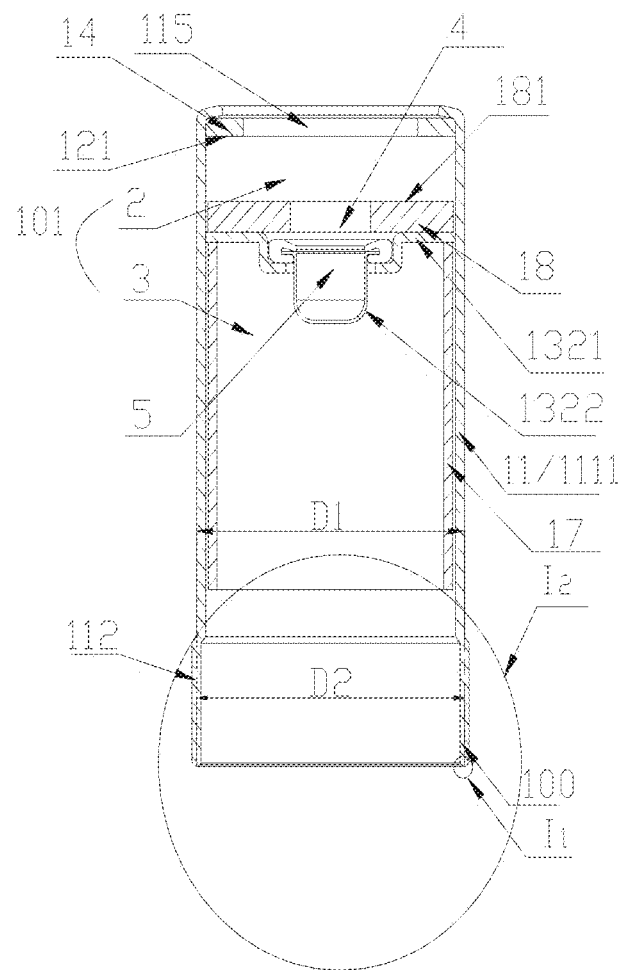
FIG. 9A is a schematic structural view of a valve core component shown in FIG. 1.
Figure 9B:
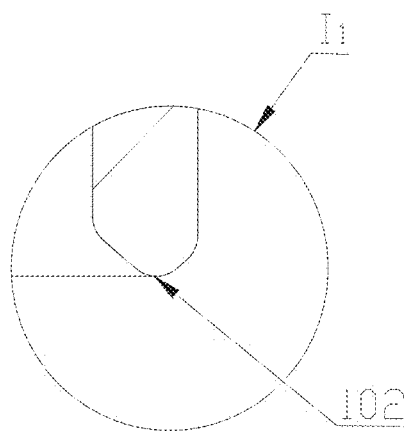
FIG. 9B is a partially enlarged view of portion I1 shown in FIG. 9A.
Figure 9C:
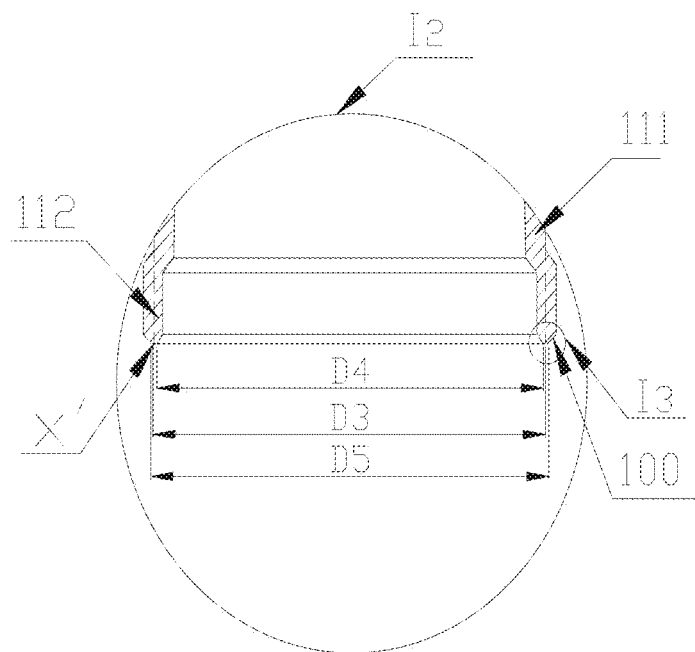
FIG. 9C is a schematic structural view of a modified example of portion I2 shown in FIG. 9A.
Figure 9D:
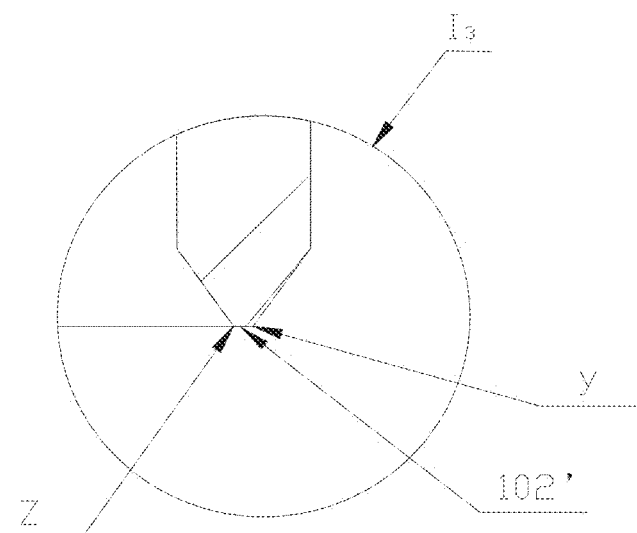
FIG. 9D is a partially enlarged view of portion I3 shown in FIG. 9C.
Figure 10:
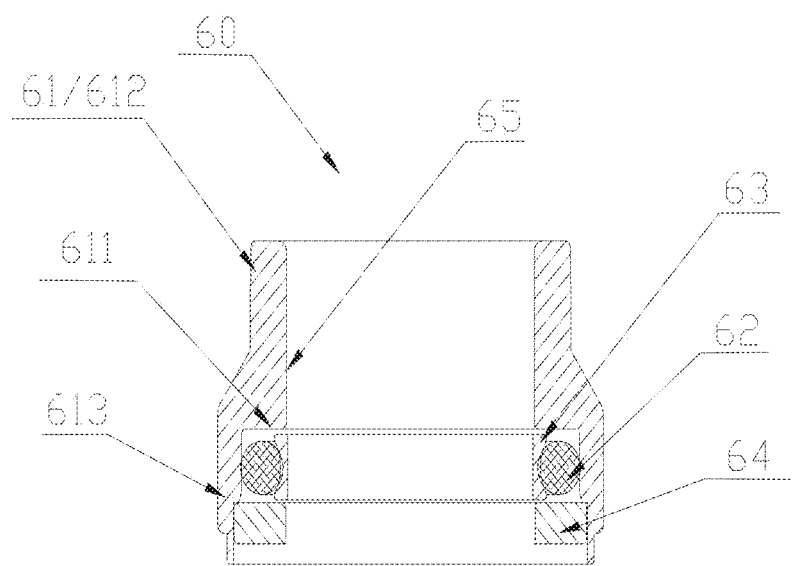
FIG. 10 is a schematic structural view of an assembly of a valve core guiding component and a sealing assembly of the electric valve shown in FIG. 1.
Figure 11A:
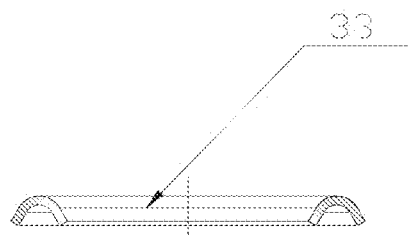
FIG. 11A is a schematic structural view of an elastic member shown in FIG. 1.
Figure 11B:
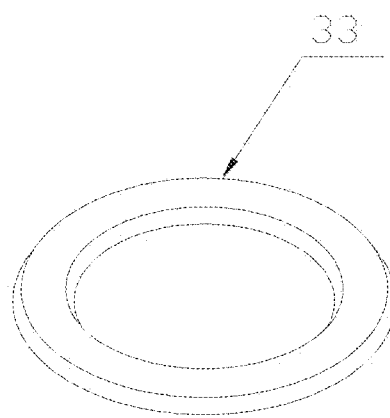
FIG. 11B is a schematic perspective view of the elastic member shown in FIG. 11A.

FIG. 1 is a schematic structural view of an electric valve according to a first embodiment of the present application in a fully open state; FIG. 2 is a schematic structural view of the electric valve according to the first embodiment of the present application in a fully closed state; FIG. 3 is a schematic structural view of a valve body component of the electric valve shown in FIG. 1; FIG. 4 is a schematic structural view of a transmission component of the electric valve shown in FIG. 1; FIG. 5 is a schematic perspective view of a screw nut kit of the electric valve shown in FIG. 1; FIG. 6 is a schematic structural view of a valve seat component of the electric valve shown in FIG. 1 after being fixed to an axial connecting pipe; FIG. 7 is a schematic structural view of a valve seat body of the electric valve shown in FIG. 1; FIG. 8 is a schematic structural view of a valve core jacket shown in FIG. 1; FIG. 9A is a schematic structural view of a valve core component shown in FIG. 1; FIG. 9B is a partially enlarged view of portion I1 shown in FIG. 9A; FIG. 9C is a schematic structural view of a modified example of portion I2 shown in FIG. 9A; FIG. 9D is a partially enlarged view of portion I3 shown in FIG. 9C; FIG. 10 is a schematic structural view of an assembly of a valve core guiding component and a sealing assembly of the electric valve shown in FIG. 1; FIG. 11A is a schematic structural view of an elastic member shown in FIG. 1; FIG. 11B is a schematic perspective view of the elastic member shown in FIG. 11A;

As shown in FIGS. 1 to 3, the electric valve according to the present solution includes a valve core component 10, a valve seat component 20, a transmission component 30, a valve body component 40, a screw nut kit 50, a valve core guiding component 60 and a coil component 70. The coil component 70 is provided on an outer peripheral portion of the valve body component 40. Specifically, the coil component 70 is sleeved on the outer periphery of the valve body component 40 and fixedly connected with the valve body component 40 via a bracket 44.

The valve body component 40 includes a valve body 41 and a valve cover 42 which are fixedly connected by welding.

The valve body 41 is a substantially cylindrical structure, which is easy to manufacture in a specific processing process by methods such as pressing, punching, rolling, extrusion shaping or the like. The processing technology therefor is simple and the production efficiency is high. The valve body 41 substantially has three sections, specifically including an upper cylinder portion 41a, a middle cylinder portion 41b and a lower cylinder portion 41c. The outer diameter of the upper cylinder portion 41a is the smallest, and the outer diameter of the middle cylinder portion 41b is greater than the outer diameter of the upper cylinder portion 41a. The outer diameter of the lower cylinder portion 41c is relatively the largest. Such an arrangement facilitates internal installation of functional parts and external welding of assembly parts, which makes the structure more compact. A first fluid port 401 is opened on a side wall of the lower cylinder portion 41c, and a radial connecting pipe 43 is fixed to the lower cylinder portion 41c of the valve body 41 by welding and is in communication with the first fluid port 401. The valve cover 42 is fixed to an outer wall of the middle cylinder portion 41b of the valve body 41, and the upper cylinder portion 41a of the valve body 41 extends into the valve cover. It will be appreciated that, the valve cover 42 may be indirectly fixed to the valve body 41 by a welding joint. The welding of other components below may also be replaced by other indirect fixing means, which will not be repeated herein. It will be appreciated that, on the premise of satisfying the assembly requirements, the valve body 41 may have a structure in which the outer diameter of the middle cylinder portion 41b is consistent with the outer diameter of the lower cylinder portion 41c, which is equivalent to that the valve body 41 substantially has a two-section structure.

As shown in FIGS. 1 and 4, the transmission member 30 is arranged in a valve chamber. The transmission member 30 includes a magnetic rotor 34, a screw rod 31 and a screw nut 32. The screw rod 31 does not axially move with respect to the valve cover 42. The magnetic rotor 34 is arranged in the valve cover 42. The magnetic rotor 34 is fixedly connected with the screw rod 31 through a connecting sheet 35. A lower end of the screw nut 32 extends into the valve body 41 and is screwed with the screw nut 32. In a large-flow electric valve, the screw rod 31 is connected with the screw nut 32 by a non-self-locking thread, which is advantageous in that, hidden danger such as stuck is avoided.

Since the magnetic rotor 34, the screw rod 31, the valve body component 40 and the coil component 70 do not move relative to each other in the axial direction, when the magnetic rotor 34 rotates under the driving force of the coil component 70, the screw rod 31 rotates circumferentially with the magnetic rotor 34, the circumferential rotation of the screw rod 31 is converted into axial movement of the screw nut 32, so that the screw nut 32 can drive a valve core component 10 to move up and down in the axial direction to open or close the electric valve.

Since the screw rod 31 does not move axially relative to the valve body component 40, and the magnetic rotor 34 is fixedly connected with the screw rod 31, the magnetic rotor 34, the screw rod 31, the valve body component 40, and the coil component 70 do not move relative to each other in the axial direction. The driving force of the coil component 70 does not change with the axial movement of the valve core component (see below) during operation. A smaller motor can be used for the valve port with a fixed size, which is conducive to product miniaturization.

In order to ensure that the screw nut 32 can convert the rotation of the screw rod 31 into axial movement so as to drive the valve core component 10 to move axially, as shown in FIGS. 1 and 5, a screw nut kit 50 cooperating with the screw nut 32 is provided between the valve body 41 and the screw nut 32 to limit the screw nut 32 from rotating in the circumferential direction, and the screw nut kit 50 is fixed to the valve body 41 by welding. An outer peripheral wall of a portion of the screw nut 32 that cooperates with the screw nut kit 50 is a cylindrical structure with a non-circular cross section. The screw nut kit 50 includes a screw nut limiting portion 51 that cooperates with the screw nut 32 to limit the rotation of the screw nut 32 and a valve core limiting portion 52 that limits the upward movement of the valve core component 10. After the screw nut 32 drives the valve core component 10 to move upward in the axial direction to a position where the valve core component 10 abuts against the valve core limiting portion 52, the valve core component 10 is unable to move upward. Specifically, the screw nut kit 50 is formed by punching and crimping metal sheet such as steel, which includes a tubular portion 55 and a flat plate portion 56 formed by bending a lower end portion of the tubular portion 55 outward; and an inner wall of the tubular portion 55 includes at least one axial planar section 58. The circumferential rotation of the screw nut 32 is limited by the cooperation between the planar section 58 and an outer edge portion of the screw nut 32. In the present solution, a cross section of the inner wall of the tubular portion 55 is substantially a square structure, and arc-shaped transitions are provided between the four sides of the square, that is, in the present specific solution, four planar sections 58 are provided to limit the circumferential rotation of the screw nut 32. In the present embodiment, the whole structure is simple by welding the flat plate portion 56 of the screw nut kit 50 to an inner edge of the middle cylinder portion of the valve body 41. The screw nut kit 50 may be formed by separately processing the tubular portion 55 and the flat plate portion 56 and then fixing the two by welding. The flat plate portion 56 serves as the valve core limiting portion to limit the maximum stroke of upward movement of the valve core component 10 in the axial direction. That is, through the screw nut kit 50 with a simple structure, the dual functions of preventing the circumferential rotation of the screw nut 32 and axially limiting the valve core component 10 are achieved.

As shown in FIGS. 1, 6 and 7, the valve seat component 20 is fixed to a lower opening of the valve body 41 by welding, forming a valve chamber 416. The valve seat component 20 includes a valve seat body 21, a valve seat core 22 and a valve port jacket 24. The valve seat body 21 is axially through, an upper end of the valve seat body 21 includes a valve port 200, and a lower end of the valve seat body 21 includes a second fluid port 201. An outer stepped portion 213 with a stepped surface facing the lower cylinder portion 41c of the valve body 41 is provided on an outer wall of the valve seat body 21, the lower cylinder portion 41c of the valve body 41 abuts against the stepped surface of the outer stepped portion 213, and is fixed thereto by welding.

The valve seat body 21 is substantially an ring structure, an upper stepped portion 211 is provided on an inner wall of the valve seat body 21 with a stepped surface facing upward, the valve seat core 22 is arranged on the upper stepped portion 211, and the valve seat core 22 includes a sealing portion 222 that cooperates with the valve core component. Specifically, the valve seat core 22 may be made of a non-metallic soft material, for example, a plastic material, and it is easy to ensure the sealing performance between the valve seat core and the valve core component 10 made of metal (steel plate in the present embodiment). The valve seat core 22 is sleeved on the valve port jacket 24. The valve seat core 22 is substantially in a " 凸 " shape with a central through hole. A cross section of the valve seat core 22 is circular. The valve seat core 22 includes a base portion 221 and a protrusion 220 protruding upward with reference to an upper end surface of the base portion 221. The outer diameter of the protrusion 220 is less than the outer diameter of the base portion 221, and the upper end surface of the protrusion 220 forms the sealing portion 222. The protrusion 220 and the base portion 221 form a stepped portion, and a valve port pressing sheet 25 is provided on the stepped portion. When the valve seat body 21 is processed, a protrusion 214 (the protrusion 214 shown in FIG. 7 is in a state before crimping) is formed on an upper end portion of the valve seat body 21. When the product is assembled, the valve port pressing sheet 25 is pressed against the stepped portion of the valve seat core 22 by crimping the protrusion 214, thereby realizing the installation and positioning of the valve seat core 22. The valve port jacket 24 is arranged inside the valve seat core 22, and together with the valve port pressing sheet 25 further ensures the installation and positioning of the valve seat core 22.

In the present solution, a lower stepped portion 212 with a stepped surface facing downward is provided on the inner wall of the valve seat body 21. As shown in FIGS. 1, 6 and 8, the valve port jacket 24 is an annular thin-walled cylinder, which includes a cylinder portion 243 and a flange portion 244 formed by flanging. The flange portion 244 abuts against an inner bottom surface of the lower stepped portion 212, and an end portion of an axial connecting pipe 23 abuts against the flange portion 244 and is in communication with the second fluid port. The axial connecting pipe 23 is fixed to the valve seat body 21 by welding. It should be noted that, the valve port jacket 24 may be a two-body structure, that is, the cylinder portion 243 and the flange portion 244 are two parts, and are fixedly connected by welding or the like.

As shown in FIGS. 6 and 8, in the present solution, a balance aperture 241 in communication with an inner chamber of the valve port jacket 24 is arranged at a position of the cylinder portion 243 of the valve port jacket 24 corresponding to the inner bottom surface of the upper stepped portion 211, and is used as a balance passage. An object of such an arrangement is that, during the operation of the electric valve, part of the medium enters and remains between a bottom of the valve seat core 22 and the stepped surface of the upper stepped portion 211 of the valve seat body 21, and when the electric valve is opened or closed, abnormal fluctuations such as instantaneous vaporization of the medium due to the instantaneous pressure change may cause the valve seat core 22 to detach from the valve seat body 21, and result in product failure, while the opening of the balance aperture 241 can keep the medium at the bottom of the valve seat core 22 in communication with the inner chamber of the axial connecting pipe 23, and can avoid the above situation.

In the valve seat component of the present solution, the installation and cooperation of the parts are compact, the mutual position accuracy can be guaranteed, the process is simple, and the product is highly reliable.

The valve chamber 416 is provided with the valve core component 10 capable of contacting with or being separated from the valve seat component 20, and the transmission component 30 controls the contact or separation of the valve core component 10 and the valve seat component 20 to open or close the electric valve.

As shown in FIGS. 1 and 9A, the valve core component 10 includes a valve core body 11 and a lower stop component. The valve core body 11 has a substantially tubular shape, and the tubular shape herein refers to that the inside of the valve core body 11 has an axial through structure, that is, the valve core body 11 has a hollow structure before assembly. The valve core body 11 has an integral structure, and can be integrally formed by drawing or stamping a metal material. A second axial through hole 115 is provided at an upper end of the valve core body 11, and a lower opening 116 is provided at a lower end of the valve core body 11. The valve core body 11 may specifically be integrally formed by stamping a welded steel pipe or drawing a steel plate. The processing technology thereof is simple, the cost thereof is saving, and the weight thereof is light. The valve core body 11 includes an annular thin-walled portion 112. When the annular thin-walled portion 112 abuts against the sealing portion 222 of the valve seat component 20, the second fluid port is not in communication with the first fluid port 401, and when the annular thin-walled portion 112 is separated from the sealing portion 222, the first fluid port 401 is in communication with the second fluid port 201. Specifically, a lower end portion 100 of the annular thin-walled portion 112 can abut against or be separated from the valve seat core 22 to open or close the valve port 200. The provision of the annular thin-walled portion 112 allows fluid to flow quickly between the valve core body 11 and the valve seat component 20, reducing the pressure difference force the valve core component 10 is subjected to and improving the action performance of the valve.

The lower stop component is provided in an inner chamber 101 of the valve core body 11 and does not move axially relative to the valve core body 11. An upper chamber 2 is located above a lower stop portion of the lower stop component, and a lower chamber 3 is located below the lower stop portion. For example, the lower stop portion may divide the inner chamber 101 into the upper chamber 2 and the lower chamber 3, and the lower stop component includes a support member 17 and a stop member 18. The support member 17 is a cylindrical structure which is open at up and down, and can be formed by drawing or stamping a metal material. In the present embodiment, the support member is a thin-walled cylinder integrally formed by stamping a welded steel pipe or drawing a steel plate. The support member 17 is fixed to an inner wall of the valve core body 11 by welding. The stop member 18 is a plate-like structure with a first axial through hole 4, which is indirectly supported by the support member 17 and is arranged inside the valve core body 11 and abuts against an upper end portion of the support member. An upper end surface of the stop member 18 forms the lower stop portion 181. The first axial through hole 4 is in communication with the upper chamber 2 and the lower chamber 3. The processing of the support member 17 and the stop member 18 also saves materials, the processing technology thereof is simple, and the weight thereof is light. In addition, after the support member 17 is welded to the inner wall of the valve core body 11, the stop member 18 only needs to be placed on the upper end surface of the support member 17 without welding, which is convenient for assembly.

In the present solution, the valve core component 10 further includes an upper stop member 14, which may be a metal gasket. The upper stop member 14 may be fixed to the valve core body 11 by crimping or welding. The upper chamber 2 is formed between the upper stop member 14 and the stop member 18, and a radial protrusion 321 of the screw nut 32 is limited to the upper chamber 2. In this case, a lower end surface of the upper stop member 14 serves as an upper stop portion 121 that can abut against the radial protrusion 321 of the screw nut 32. In a case that two parts, the upper stop member 14 and the valve core body 11, cooperate with each other, the valve core body 11 can be formed by a welded steel pipe, which can save material costs.

It should also be noted that, it is also applicable not to separately provide the upper stop member 14 as long as an upper end portion of the valve core body 11 forms a transversely curved portion extending in the radial direction, wherein a lower end surface of the transversely curved portion serves as the upper stop member, and it is also applicable that an inner edge of the transversely curved portion forms the second axial through hole communicating with the upper chamber. For example, the transversely curved portion is integrally formed by drawing or stamping a metal material, the processing technology of which is simpler.

It should be noted that in the present solution, "the stop member 18 is indirectly supported by the support member 17" means that the stop member 18 is not in direct contact with the support member 17. In the present solution, the valve core component 10 further includes a filter component 13 to filter impurities in the fluid in the valve. The filter component 13 is hanged over between the upper end portion of the support member 17 and the lower end portion of the stop member 18. The filter component 13 includes a filter member 131 and a support ring 132 for mounting the filter member 131. The support ring 132 includes an outer flange portion 1321 and an inner recess 1322 with a third axial through hole 5. An upper end surface of the outer flange portion 1321 abuts against a lower end surface of the stop member 18 and the upper end surface of the support member 17. The filter member 131 penetrates through the third axial through hole 5, and is in communication with the lower chamber 3 and the first axial through hole 4. It is conceivable that, in a case that the filter component 13 is not provided, it is also applicable that the stop member 18 is directly supported by the support member 17.

The valve core component 10 further includes a balanced flow path including the lower opening 116 of the valve core body 11, the lower chamber 3, the first axial through hole 4 of the stop member 18, the upper chamber 2, and the second axial through hole 115 of the valve core body 11. The arrangement of the balance flow path is conducive to the balance of the upper and lower pressures of the valve core component 10, and is helpful to reduce the pressure difference the valve core component 10 is subjected to during the axial movement thereof.

The screw nut 32 is formed by injection molding a plastic material, one end of which extends into the upper chamber 2 and the other end of which extends out from the upper chamber 2. The screw nut 32 can move axially relative to the second axial through hole 115. A large clearance is provided between the screw nut 32 and a wall of the second axial through hole 115. The radial protrusion 321 of screw nut 32 located in the upper chamber 2 can cooperate with the upper stop portion 121 of the valve core component 10, so that the screw nut 32 can drive the valve core component 10 to move upward in an axial direction of a guide sleeve described below. When the screw nut 32 drives the valve core component 10 to move up to a position where the valve core component 10 abuts against the valve core limiting portion 52 of the screw nut kit 50, the electric valve is in a fully open state. When the screw nut 32 moves downward, since the radial protrusion 321 supports the upper stop portion 21, the valve core component 10 moves downward under its own gravity, causing the lower end portion 100 of the annular thin-walled portion 112 to abut against the sealing portion 222 of the valve seat core 22. When the valve is fully closed, the lower end portion of the screw nut 32 can cooperate with the lower stop portion 181 to limit the screw nut 32 from moving downward.

As shown in FIGS. 1 and 10, in order to ensure that the valve core component 10 does not shift axially during the axial movement of the screw nut 32, in the valve chamber 416, a valve core guiding component 60 fixedly connected with the valve body component 40 is provided on the outer peripheral portion of the valve core component 10 for guiding the valve core component 10, which is fixed to an inner edge of the middle cylinder portion 41b of the valve body 41 by welding. The valve core guiding component 60 includes a guide sleeve 61.

The guide sleeve 61 has a substantially cylindrical structure with a small upper part and a large lower part, and includes a guide section 612 in sliding clearance fit with the valve core component 10 to guide the valve core component, and an installation section 613 located below the guide section 612. Inner walls of the guide section 612 and the installation section 613 are substantially cylindrical. An inner diameter of the guide section 612 is less than the inner diameter of the installation section 613. Specifically, the inner wall 65 of the guide section 612 serves as a guide surface to guide the valve core component 10. An accommodating space 1 is provided between the inner wall of the installation section 613 and the outer wall of the valve core body 11 for accommodating a sealing assembly. The sealing assembly is sleeved on the outer peripheral portion of the valve core body 11 and is arranged between the inner wall of the installation section 613 and the outer wall of the valve core body 11. The sealing assembly includes a sealing component and a lower position-limiting member 64. The sealing component includes an annular slide sheet 63 and a sealing ring 62 that is sleeved on an outer peripheral portion of the slide sheet 63. Specifically, a second positioning stepped portion 611 with a stepped surface facing downward is provided between the guide section 612 and the installation section 613, the lower position-limiting member 64 is fixed to the lower end portion of the installation section 613 by crimping or welding, and the sealing component is positioned by the second positioning stepped portion 611, and is position-limited, by the lower position-limiting member 64, between the second positioning stepped portion 611 and the lower position-limiting member 64. In the present specific solution, the lower position-limiting member 64 is a gasket.

As shown in FIGS. 1, 9A and 9B, on the basis of the foregoing technical solution, in order to improve the sealing performance when the valve is closed, the lower end portion 100 of the annular thin-walled portion 112 may be designed as an arc structure. Furthermore, the valve core body 11 may have a structure with a smaller upper part and a larger lower part, and include a straight tubular guide fitting section 1111 in sliding clearance fit with the guide sleeve 61, and the annular thin-walled portion 112 arranged below the guide fitting section 1111. The outer diameter the annular thin-walled portion 112 is greater than the outer diameter of the guide fitting portion 1111, and the inner diameter of the annular thin-walled portion 1112 is greater than the inner diameter of the guide fitting section 1111. Further, a diameter of a sealing portion of the sealing assembly and the guide fitting section 1111 of the valve core body 11 is defined as D1, and D1 is the outer diameter of the guide fitting section 1111 of the valve core body 11. The lower end portion 100 of the annular thin-walled portion 112 is of an arc structure as shown in FIG. 9B. A bottom end 102 of the arc structure cooperates with the valve seat core 22 to seal. The diameter of the ring where the bottom end 102 of the arc structure is located is defined as D2, the diameter of the outer wall of the valve core body 11 is defined as D1, and D1 is designed to be equal to or approximately equal to D2, that is, a projection of the outer wall of the valve core body 11 in the horizontal direction substantially coincides with the circle line where the bottom end of the arc is located, so that the pressure difference of the fluid the valve core component 10 is subjected to can be reduced as much as possible, the opening and closing of the valve are smoother, and it is easy to open and close the valve, further improving the reliability of the valve actions.

As an alternative, as shown in FIGS. 9C and 9D, a lower end of the lower end portion 100 of the annular thin-walled portion 112 may have a truncated cone structure as shown in FIG. 9D, of which the diameter gradually tapers toward the valve port 200 (that is, the upper part is larger and the lower part is smaller), which includes an annular sealing plane 102'. The annular sealing plane 102' can abut against or be separated from the valve seat core 22. The projection of the outer wall of the guide fitting section 1111 in the horizontal direction substantially coincides with a center circle line of the annular sealing plane 102'. That is, the projection of the outer wall of the valve core body 11 on the annular sealing plane 102' is defined as a seal circle line X', the diameter of the seal circle line is defined as D3, the diameter of an outer circle line y of the annular sealing plane 102' is defined as D4, and the diameter of an inner circle line Z is defined as D5, then D3 is equal to or approximately equal to half of D4−D5, that is, D3=(D4−D5)/2, or (D4−D5)/2, which also reduces the pressure difference of the fluid the valve core component 10 is subjected to, make the opening and closing of the valve smoother, and facilitates the opening and closing of the valve.

Figure 17:
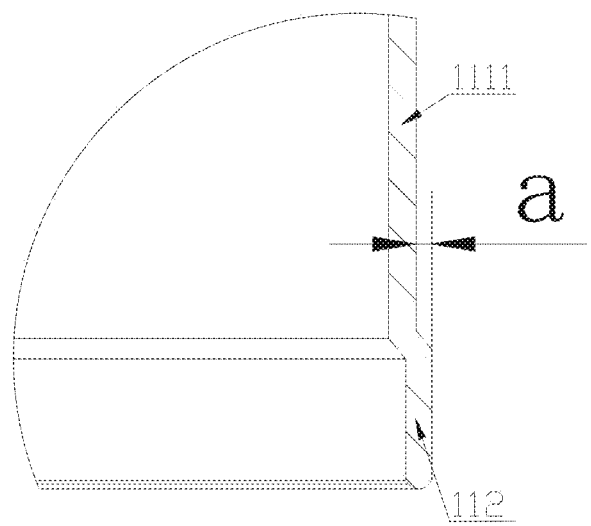
FIG. 17 is a schematic structural view of a modified example of portion I2 shown in FIG. 9A.

As another alternative, a distance from an outer surface of the guide fitting section 1111 of the valve core body 11 to an outer surface of the annular thin-walled portion 112 is less than or equal to 0.5 mm. As shown in FIG. 17, the distance from the outer surface of the guide fitting section 1111 to the outer surface of the annular thin-walled portion 112 is represented as a, the distance a≤0.5 mm. With such an arrangement, an annular area of the transition between the outer surface of the guide fitting section 1111 of the valve core body 11 and the outer surface of the annular thin-walled portion 112 is relatively small, and the outside pressure difference force (pressure difference force=the ring area*the pressure difference) is smaller, and the action performance of the valve can be further improved.

Figure 6A:
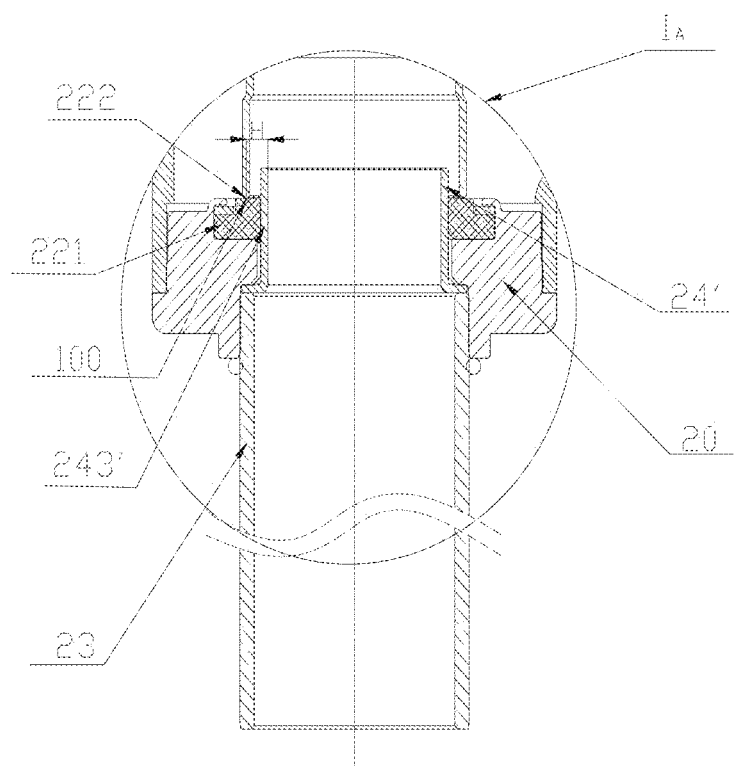
FIG. 6A is a schematic structural view of a modified example of portion IA shown in FIG. 2.

In addition, in the electric valve of the present embodiment, the valve port jacket may have other alternative designs. FIG. 6A is a schematic structural view of a modified example of portion IA shown in FIG. 2. As shown in FIG. 6A, the upper end portion of a cylinder portion 243' of a valve port jacket 24' is higher than the sealing portion 222 of the valve seat core 22 in the axial direction, and a shortest radial distance H between the center circle line of the projection of the annular thin-walled portion 112 in the horizontal direction and an inner edge wall of the cylinder portion 243' is less than 2 mm. The projection of the annular thin-walled portion 112 in the horizontal direction is circular, and the center circle line is equidistant from the inner and outer edges of the projection. Since the valve port jacket 24' is higher than the upper end portion 222 of the valve seat core 22 in the axial direction, the higher portion of the valve port jacket 24' can block the instant impact of the high-pressure fluid to make the valve opening process stable, when the annular thin-walled portion 112 of the valve core component 10 leaves the sealing portion 222 of the valve seat core 22 to open the valve port 200. Besides, the radial shortest distance H is controlled to be less than 2 mm, which can also reduce the instant impact of the high-pressure fluid on the annular thin-walled portion 112 and make the valve opening process stable.

The electric valve can realize bidirectional flow, and the fluid can flow in from the radial connecting pipe 43 and flow out from the axial connecting pipe 23, or can flow in from the axial connecting pipe 23 and flow out from the radial connecting pipe 43.

In the following, an example will be described in which fluid flows in from the radial connecting pipe 43 and flows out from the axial connecting pipe 23. The magnetic rotor 34 rotates clockwise or counterclockwise under the driving of the electromagnetic coil, thereby driving the screw nut 32 to move up and down in the axial direction. It may be set that, when the magnetic rotor 34 rotates clockwise, the valve core component 10 moves toward the valve port 200, and when the magnetic rotor 34 rotates counterclockwise, the valve core component 10 moves away from the valve port 200. As shown in FIGS. 1 and 2, when the electric valve is in the fully open state shown in FIG. 1, the valve core component 10 cannot move upward further in the axial direction due to the limitation by the valve core limiting portion 52, the coil component 70 is energized to drive the magnetic rotor 34 to rotate clockwise, and the circumferential rotation of the magnetic rotor 34 is converted into the axial movement of the screw nut 32 by the rotation of the screw rod 31, so that the screw nut 32 drives the valve core component 10 to move down until the lower end portion 100 of the annular thin-walled portion 112 closes the valve port 200, that is, the electric valve is in the state shown in FIG. 2. When the valve needs to be opened, the coil component 70 is energized to drive the magnetic rotor 34 to rotate counterclockwise, and the radial protrusion 321 of the screw nut 32 abuts against the upper stop portion 121 of the valve core component 10, so that the screw nut 32 carries the valve core component 10 to move upward in the axial direction until the valve core component 10 abuts against the valve core limiting portion 52 of the screw nut kit 50, reaching the fully open state of the valve shown in FIG. 1.

During the operation of the electric valve, after the electric valve is de-energized, the torque of the magnetic rotor is transmitted to the screw nut 32 and the valve core component 10 through the screw rod 31, thereby maintaining the position of the valve core component 10 to close the valve. However, in the actual operation of the electric valve, due to vibration and other reasons, the screw rod 31 may slip relative to the transmission thread of the screw nut 32, resulting in the failure of the locking force transmitted by the screw rod 31 to the screw nut 32 and the valve core component 10, resulting in that the valve cannot be effectively closed, and further bringing about leakage problems.

To this end, in a further design, as shown in FIGS. 1, 4, 11A and 11B, in the electric valve of this solution, the screw nut 32 further includes a ring-shaped lower extension 322. The lower extension 322 is provided in the upper chamber 2, and extends substantially downward along the radial protrusion 321. An elastic member 33 is provided between the screw nut 32 and the stop member 18, and is sleeved on the outer periphery of the lower extension 322. One end of the elastic member 33 abuts against the radial protrusion 321, and another end thereof abuts against the lower stop portion 181. When the annular thin-walled portion 112 is separated from the sealing portion 222, an axial gap is present between a lower end of the lower extension 322 and the lower stop portion 181. In the closed state of the valve, after the annular thin-walled portion 112 abuts against the sealing portion 222, the lower end of the lower extension 322 abuts against the lower stop portion 181. If the aforementioned situation that may cause leakage occurs, the elastic force of the elastic member 33 can press the valve core component 10 tightly against the valve seat core 22, ensuring that the valve port 200 is closed and preventing leakage. The elastic member in this solution is specifically a leaf spring 33 shown in FIGS. 11A and 11B. Apparently, the elastic member may be a compression spring shown in FIG. 14 in the second embodiment below. In a case that the elastic member is the compression spring, the structure of the screw nut 32 is correspondingly changed to a screw nut 32A in the second embodiment. In addition, the elastic member may be an O-ring shown in FIG. 15 in the third embodiment below, as long as the elastic member can achieve the foregoing functions.

A method for manufacturing the electric valve of the present embodiment is described hereinafter:

S1: providing a hollow valve core body 11 with an integral structure;

S2: providing a valve seat core 22 with a sealing portion 222 and a valve seat body 21 and a valve port jacket 24 made of metal materials, wherein an upper end surface of the valve seat body 21 is provided with an upper stepped portion 211 with a stepped surface facing upward for mounting the valve seat core; mounting the valve seat core 22 on the upper stepped portion 211 and crimping an upper end of the valve seat body 21 to the valve seat core 22, and fixing an outer wall of the valve port jacket 24 to the valve seat body 21 by welding;

S3: providing a guide sleeve 61 and a sealing assembly, wherein an inner wall of an installation section 613 and an inner wall of a guide section 612 form a second position-limiting stepped portion 611 with a stepped surface facing downward; mounting the sealing assembly to the second position-limiting stepped portion 611; and then fixing a lower end of the guide sleeve 61 to a ring-shaped lower position-limiting member 64 by crimping or welding;

S4: fixing the guide sleeve 61 to the valve body 41 by welding to form a first assembly after the step S3;

S5: providing a screw nut 32, an upper stop member 14, an elastic member 33 and a lower stop component, wherein the lower stop component includes a support member 17 and a stop member 18; fixing the upper stop member 14 to the valve core body 11 by welding; inserting the screw nut 32 into an inner chamber 101 of the valve core body 11 and extending a threaded connection end of the screw nut 32 out of the valve core body 11, so that a radial protrusion 321 of the screw nut 32 is position-limited by the upper stop member; sleeving the elastic member 33 on a periphery of a lower end portion of the screw nut 32; then mounting the stop member 18 with a first axial through hole 4 into the inner chamber of the valve core body, then mounting the support member 17 therein, and then fixing the support member 17 to the valve core body 11 by welding to form a second assembly;

S6: assembling the second assembly with the first assembly from bottom to top, so that the screw nut 32 is in threaded connection with the screw rod 31;

S7: fixing the valve body 41 to the valve seat body 21 by welding.

S8: fixedly connecting a rotor 41 to an upper end of the screw rod 31 via a connecting sheet 35;

S9: fixing the valve body 41 to a valve cover 42 by welding; and

S10: fixing a coil component 70 to an outer peripheral portion of the valve cover 42 via a bracket 44.

It should be noted that, the step numbers of S1 to S7 do not imply the order of the steps. As long as the electric valve of this embodiment can be manufactured, the order of the steps is adjustable.

Figure 12:
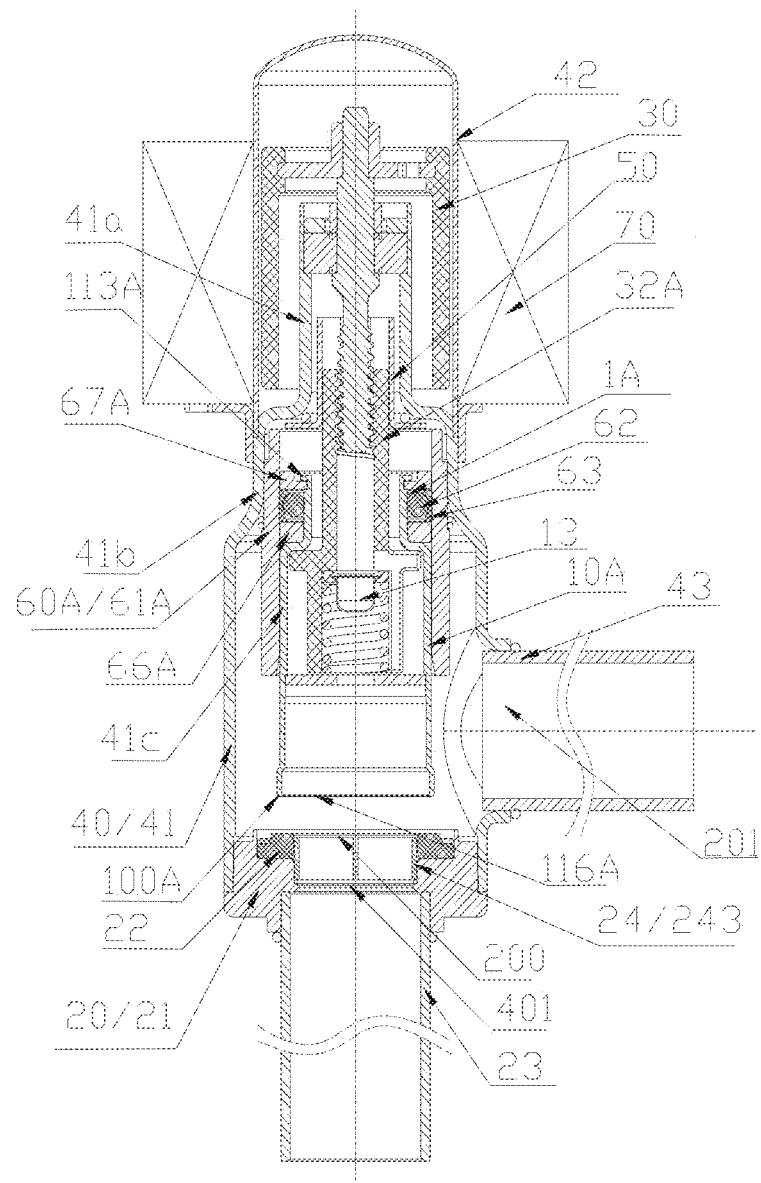
FIG. 12 is a schematic structural view of the electric valve according to a second embodiment of the present application in an open state.
Figure 13:
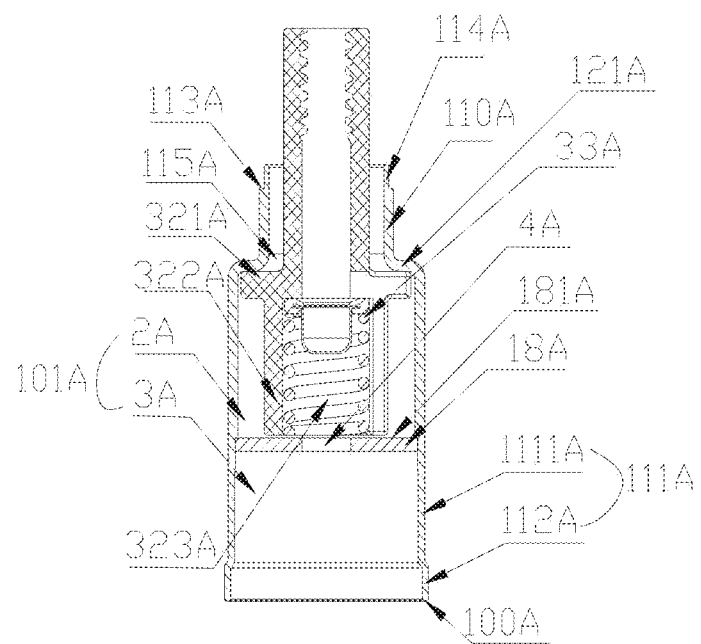
FIG. 13 is a schematic structural view of an assembly of a screw nut and a valve core component of the electric valve shown in FIG. 12.

FIG. 12 is a schematic structural view of the electric valve according to the second embodiment of the present application in an open state, and FIG. 13 is a schematic structural view of an assembly of the screw nut and the valve core component of the electric valve shown in FIG. 12.

For ease of description, same reference numerals are used to represent parts in this embodiment with the same structures as in the other embodiments.

As shown in FIGS. 12 to 13, the electric valve according to the present solution includes a valve core component 10A, a valve seat component 20, a transmission component 30A, a valve body component 40, a screw nut kit 50A, a valve core guiding component 60A and a coil component 70.

In this solution, the valve seat component 20, the valve body component 40, the screw nut kit 50A, the coil component 70, the screw rod 31 of the transmission component 30A, the magnetic rotor 34, the lower end portion 100 of the annular thin-walled portion 112A, and the distance relationship between the inner wall of the valve port jacket and the annular thin-walled portion shown in FIG. 6A can be understood with reference to the text description and related drawings of the first embodiment, and have the same configuration. The specific structures thereof will not be repeated herein again. The structures of the valve core component 10A and the valve core guiding component 60A of this embodiment are different from those in the first embodiment, and accordingly, the manner of cooperation between the sealing assembly and the valve core guiding component 60A and that between the sealing assembly and the valve core component 10A are also changed.

As shown in the figures, in this solution, the valve core guiding component 60A, which guides the valve core component 10A, includes a guide sleeve 61A. The guide sleeve 61A has a substantially cylindrical structure, which is fixed to an inner edge of the middle cylinder portion 41b of the valve body 41 by welding.

The valve core component 10A is moveable up and down in the axial direction in an inner chamber of the guide sleeve 61A, and is capable of being in sliding clearance fit with an inner wall of the guide sleeve 61A. The valve core component 10A includes the annular thin-walled portion 112A. By controlling the axial movement of the valve core component 10A, the contact or separation of the annular thin-walled portion 112A and the sealing portion of the valve seat component 20 is controlled to open or close the electric valve.

The valve core component 10A in this embodiment includes a valve core body 11A and a lower stop component provided in the valve core body 11A. The valve core body 11A is substantially in a hollow cylinder shape. The valve core body 11A has an integral structure, and can be integrally formed by drawing or stamping a metal material. The valve core body HA includes an upper opening and a lower opening 116A. The valve core body 11A may specifically be integrally formed by stamping a welded steel pipe or drawing a steel plate. The processing technology thereof is simple, the cost thereof is saving, and the weight thereof is light.

The valve core body 11A includes a diameter-reduced section 110A, and a large-diameter section 111A which is capable of being in sliding clearance fit with the inner wall of the guide sleeve 61A. The inner diameter the large-diameter section 111A is greater than the inner diameter of the diameter-reduced section 110A, and the outer diameter of the large-diameter section 111A is greater than the outer diameter of the diameter-reduced section 110A. A second axial through hole 115A is provided between the large-diameter section 111A and the diameter-reduced section 110A. The large-diameter section 111A includes a guide fitting section 1111A which is in sliding clearance fit with the inner wall of the guide sleeve 61A and the annular thin-walled portion 112A provided below the guide fitting section. The outer diameter the annular thin-walled portion 112A is greater than the outer diameter of the large-diameter section 111A, and the inner diameter of the annular thin-walled portion 112A is greater than the inner diameter of the large-diameter section 111A. The lower end portion 100 of the annular thin-walled portion 112A abuts against or is separated from the sealing portion 222 of the valve seat core 22. When the lower end portion abuts against the sealing portion, the second fluid port 201 is not in communication with the first fluid port 401, and when the lower end portion is separated from the sealing portion, the second fluid port 201 is in communication with the first fluid port 401. A transition section 121A is formed between the diameter-reduced section 110A and the large-diameter section 111A. A lower end surface of the transition section 121A forms the upper stop portion, and an upper end of the diameter-reduced section 110A is provided with a crimping portion 114A for fixing the sealing assembly by crimping (FIG. 13 shows a state before the crimping portion 114A is crimped).

An inner wall of the guide fitting section 1111A includes a first positioning stepped portion 1113A with a stepped surface facing downward. The lower stop component includes a plate-shaped lower stop member 18A fixed to the inner wall of the large-diameter section 111A by welding. The lower stop member 18A includes a first axial through hole 4A, and an upper end surface of the lower stop member 18A forms a lower stop portion 181A. An upper end of the lower stop member 18A abuts against the stepped surface of the first positioning stepped portion 1113A, and is fixed to the inner wall of the guide fitting section 1111A by welding. An upper chamber 2A is located above the lower stop portion 181A of the lower stop member 18A, and a lower chamber 3A is located below the lower stop portion 181A. For example, the lower stop portion 181A may divide an inner chamber 101A of the valve core body 11A into the upper chamber 2A and the lower chamber 3A. The first axial through hole 4A of the lower stop member 18A is in communication with the upper chamber 2A and the lower chamber 3A.

A sealing assembly is provided between the valve core component 10A and the guide sleeve 61A. When the electric valve is in the fully closed state, the sealing assembly ensures that the radial connecting pipe 43 of the electric valve is not in communication with the valve port 200. Specifically, the sealing assembly of this embodiment is installed in an accommodating space 1A between the diameter-reduced section 110A of the valve core body 11A and the guide sleeve 61A, and is located between an outer edge of the diameter-reduced section 110A and the inner wall of the guide sleeve 61A. The sealing assembly includes an upper position-limiting member 67A, a lower position-limiting member 66A, and a sealing component provided between the lower position-limiting member 66A and the upper position-limiting member 67A. The sealing component includes a sealing ring 62 made of a wear-resistant material and a slide sheet 63 made of a rubber material. The sealing ring 62 is nested in the sliding sheet 63. The upper position-limiting member 67A and the lower position-limiting member 66A may be gaskets. The lower position-limiting member 66A is sleeved on the outer periphery of the diameter-reduced section 110A and hanged over at an upper end surface of the transition section 121A. An upper positioning step 113A is provided at an outer edge of the upper end portion of the diameter-reduced section 110A of the valve core body 11A. The upper position-limiting member 67A is positioned by the upper positioning step 113A and fixed to the diameter-reduced section 110A by welding, or the upper position-limiting member 67A is fixed by the upper end portion of the diameter-reduced section 110A by crimping. The sealing assembly is provided between the upper gasket 67A and the lower gasket 66A, and is axially position-limited by the two.

The screw nut 32A includes a radial protrusion 321A and a lower extension 322A located in the upper chamber 2A. In the open state of the valve, the radial protrusion 321 of the screw nut 32A can abut against the upper stop portion of the valve core body HA, so that the screw nut 32A can drive the valve core component 10 to move upward in the axial direction of the guide sleeve 61. When the valve port 200 needs to be closed, the screw nut 32A tends to move in a valve-closing direction, and the valve core component 10A moves downward. When the valve is in the fully closed state, a lower end of the lower extension 322A can abut against the lower stop portion 181A.

The screw nut 32A further includes an accommodating chamber 323A, and at least part of the elastic member 33A is arranged in the accommodating cavity 323A. In this solution, the elastic member is a compression spring 33A. A predetermined gap is provided between the lower extension 322A of the screw nut 32A and the lower stop portion 181A of the stop member 18A. One end of the compression spring 33A abuts against the lower stop portion 181A, and another end thereof abuts against the screw nut 32A. In addition to the function of the elastic member in the first embodiment, an upper end of the compression spring 33A in this solution further supports a filter assembly 13A. The filter assembly 13A filters impurities in the fluid in the valve. Apparently, it is conceivable that, in this embodiment, the structure of the screw nut 32A may have a same structure as the screw nut 32 in the first embodiment, and the compression spring 33A may be correspondingly altered to the leaf spring shown in the first embodiment or an O-ring.

According to the foregoing structural design, the valve core component 10A further includes a balanced flow path including the lower opening 116A of the valve core body 11A, the lower chamber 3A, the first axial through hole 4A of the stop member 18A, the upper chamber 2A, and the upper opening of the diameter-reduced section 110A. The arrangement of the balance flow path is conducive to the balance of the upper and lower pressures of the valve core component 10A, and is helpful to reduce the pressure difference the valve core component 10A is subjected to.

In this solution, in order to reduce a pressure-bearing area of the annular thin-walled portion 112A, the lower end portion 100A of the annular thin-walled portion 112A may be designed with reference to the lower end portion 100 of the annular thin-walled portion 112 in FIGS. 9B and 9D, which will not be repeated herein again. It should be noted here that, in this case, D1 should be the diameter of the sealing portion of the sealing assembly and the guide sleeve 61A, and is roughly equal to the outer diameter of the large-diameter section 111A or the inner diameter of the guide sleeve 61A.

The beneficial effects and working process of the electric valve are similar to those of the first embodiment, which can be understood with reference to the first embodiment and will not be repeated herein again. It should be noted that, the difference between this embodiment and the first embodiment mainly lies in that, in this embodiment, the sealing assembly moves synchronously with the movement of the valve core component 10A. While in the first embodiment, during the entire working process of the electric valve, since the sealing assembly is fixed in the guide sleeve 61, the sealing assembly does not move with the axial movement of the valve core component 10. The electric valve of this embodiment also has the beneficial effects of the electric valve of the first embodiment, and on this basis, compared with the first embodiment, the structure and processing technology of the valve core component 10A are simpler, the number of parts thereof is reduced, and the installation thereof is more convenient.

A method for manufacturing the electric valve of the present embodiment is described hereinafter.

The method includes the following steps:

S1: providing the hollow valve core body 11A with an integral structure, wherein an upper positioning step 113A with a stepped surface facing upward is formed on an outer wall of the upper end portion of the diameter-reduced section 110A;

S2: providing the valve seat core 22 with the sealing portion 222 and the valve seat body 21 and the valve port jacket 24 made of metal materials, wherein an upper end surface of the valve seat body 21 is provided with the upper stepped portion 211A with a stepped surface facing upward for mounting the valve seat core; mounting the valve seat core on the upper stepped portion 211A and crimping an upper end of the valve seat body 21 to the valve seat core, and fixing an outer wall of the valve port jacket 24 to the valve seat body 21 by welding;

S3: providing the guide sleeve 61A, and fixing the guide sleeve 61A to the valve body 41 by welding to form a first assembly;

S4: providing the screw nut 32A, the sealing assembly, the elastic member 33A, and the lower stop component, wherein the sealing assembly is sleeved on the outer peripheral portion of the diameter-reduced section, and the lower end of the upper position-limiting member 67A abuts against the upper positioning step 113A; crimping the upper end of the diameter-reduced section 110A to the sealing assembly; inserting the screw nut 32A into the inner chamber 2A of the valve core body 11A and extending a threaded connection end of the screw nut 32A out of the valve core body 11A so that the radial protrusion 321A of the screw nut 32A is position-limited by the transition section 121A; mounting the lower stop component into the inner chamber, and then fixing the lower stop component to the valve core body by welding to form a second assembly;

S5: assembling the second assembly with the first assembly from bottom to top, so that the screw nut 32A is in threaded connection with the screw rod 31; and S6: fixing the valve body 41 to the valve seat body 21 by welding.

The assembly steps after S6 can refer to the previous embodiment for understanding, which will not be repeated herein again.

It should be noted that, the step numbers of S1 to S6 do not imply the order of the steps. As long as the electric valve of this embodiment can be manufactured, the order of the steps is adjustable.

Figure 14:
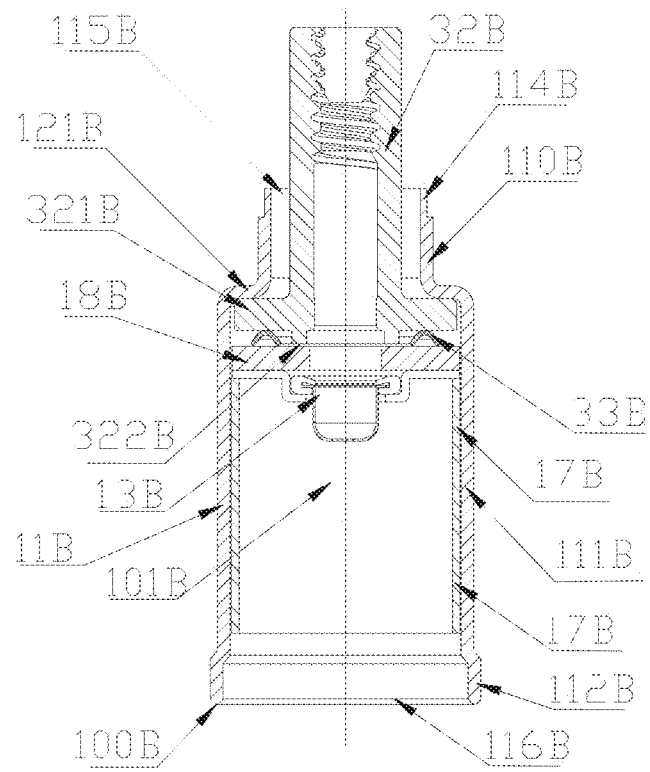
FIG. 14 is a schematic structural view of an assembly of the screw nut and the valve core component of the electric valve according to a third embodiment of the present application.

FIG. 14 is a schematic structural view of an assembly of the screw nut and the valve core component of the electric valve according to the third embodiment of the present application.

Other parts of this embodiment substantially have the same structures as those of the second embodiment, that is, except for the components shown in FIG. 14, the description of the structures of the components in the second embodiment is incorporated in this embodiment, and will not be repeated herein again.

As shown in the figure, a valve core body 11B is integrally formed by drawing or stamping a metal material, and is a cylindrical member including an upper opening 115B and a lower opening 116B. The processing technology thereof is simple, the cost thereof is saving, and the weight thereof is light. The valve core body 11B includes a diameter-reduced section 110B, a large-diameter section 111B which is capable of being in sliding clearance fit with the inner wall of the guide sleeve, and an annular thin-walled portion 112B with an inner diameter greater than that of the large-diameter portion 111B. A transition section 121B serving as the upper stop portion is formed between the diameter-reduced section 110B and the large-diameter section 111B. An upper end of the diameter-reduced section 110B is provided with a crimping portion 114B for fixing the sealing assembly by crimping. The lower stop component includes a support member 17B fixed to the inner wall of the large-diameter section 111B by welding, and a stop member 18B indirectly supported by the support member 17B. An upper end surface of the stop member 18B forms a lower stop portion 181B.

An upper chamber 2B is provided between the valve core body 11B and the lower stop component. The screw nut 32B includes a radial protrusion 321B in the upper chamber 2B and a lower extension 322B. In the open state of the valve, the radial protrusion 321B of the screw nut 32B abuts against the transition section 121B of the valve core body 11B. According to the foregoing structural design, the valve core component 10B further includes a balanced flow path including the lower opening 116B of the valve core body 11B, the first axial through hole 4B of the lower stop member 18B, the upper chamber 2B, and the upper opening of the valve core body 11B. The arrangement of the balance flow path is conducive to the balance of the upper and lower pressures of the valve core component 10B, and is helpful to reduce the pressure difference the valve core component 10B is subjected to.

Figure 15:
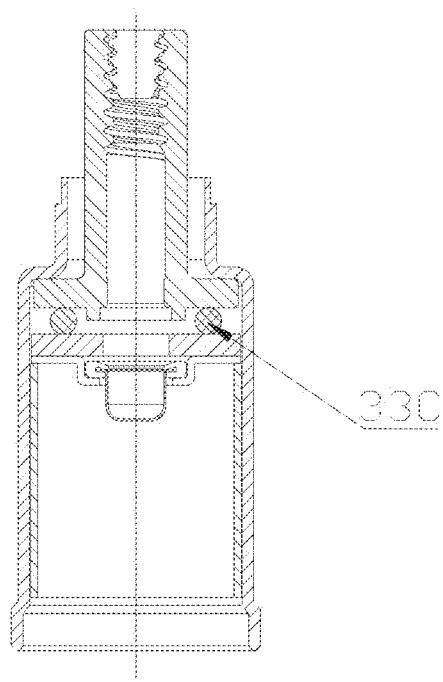
FIG. 15 is a schematic structural view of the assembly in FIG. 14 with the leaf spring being replaced with an O-ring.

An elastic member is provided between the screw nut 32B and the lower stop component. In this solution, the elastic member is a leaf spring 33B. The structure of the leaf spring 33B is shown in FIGS. 11A and 11B. Apparently, it is conceivable that the leaf spring 33B in this embodiment may be replaced by an O-ring 33C. FIG. 15 is a schematic structural view of the assembly in FIG. 14 with the leaf spring being replaced by an O-ring. The structure of the screw nut 32B may have a same structure as the screw nut 32A in the second embodiment, and the leaf spring 33B may be correspondingly altered to the compression spring 33A shown in the second embodiment.

In this embodiment, the structure of the lower end portion 100B of the annular thin-walled portion 112B may be designed with reference to FIGS. 9B and 9D, and will not be repeated herein again.

Figure 16:
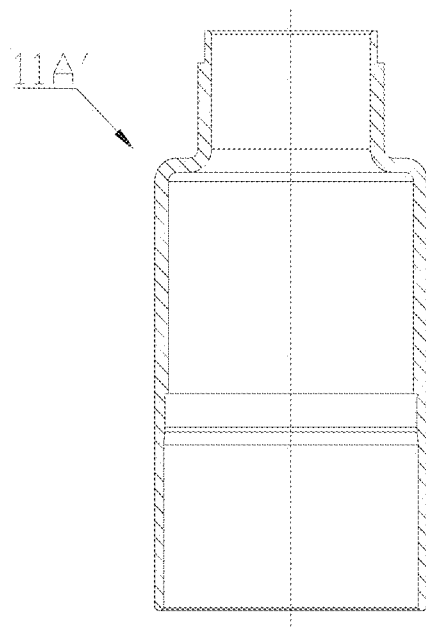
FIG. 16 is a schematic structural view of a modified example of the valve core body of the electric valve according to the second embodiment of the present application.

It should be noted that, the core idea of the present application has been described herein with reference to the specific embodiments, and it is conceivable that the annular thin-walled portion of the valve core body of the valve core component in each embodiment may have the same outer diameter and inner diameter as the guide fitting section, that is, it is applicable that the annular thin-walled portion is not provided in a funnel-like shape. For example, the valve core body 11A in the second embodiment of the electric valve may have other shapes. FIG. 16 is a schematic structural view of a modified example of the valve core body of the electric valve according to the second embodiment of the present application. As shown in the figure, the large-diameter section of the valve core body 11A' has a cylindrical shape with a substantially uniform outer diameter.

In the electric valve of this embodiment, the valve core body has a substantially integrated tubular structure, the processing technology thereof is simple, and the valve core body is easy to be processed into a thin-walled part, which can save materials and reduce the weight of the valve. The lower stop component is provided in the inner chamber of the valve core body, without occupying extra space of the valve, which is conducive to the miniaturization of the valve. The lower stop portion of the lower stop component divides the inner chamber into an upper chamber and a lower chamber. The lower stop component includes a first axial through hole communicating with the upper chamber and the lower chamber, so that an axial through structure is formed in the valve core, which is conducive to the internal balance of the valve. The valve core body includes an annular thin-walled portion that cooperates with a sealing portion of the valve seat component. The arrangement of the annular thin-walled portion can further reduce the pressure difference force the valve core component is subjected to, which is conducive to the pressure balance inside the valve and improves the action performance of the valve.

It should be noted that, based on the description of the foregoing technical solutions, it is conceivable that the electric valve of the present application can be used as an on/off valve and can also be used as a flow regulating valve by controlling the flow rate of the valve port.

The electric valve and the manufacturing method therefor provided by the present application are described in detail hereinbefore. The principle and the embodiments of the present application are illustrated herein by specific examples. The above description of examples is only intended to facilitate the understanding of the concept of the present application. It should be noted that, for the person skilled in the art, a few of improvements and modifications may be made to the present application without departing from the principle of the present application, and these modifications and improvements are also deemed to fall into the protection scope of the present application defined by the claims.

The invention claimed is:

1. An electric valve, comprising:
    a valve body component comprising a valve body, wherein the valve body comprises a first fluid port;
    a valve seat component fixedly connected to the valve body component and comprising a valve seat body, wherein the valve seat body comprises a second fluid port;
    a transmission component arranged in a valve chamber of the electric valve and comprising a screw rod and a screw nut, wherein the screw rod is in threaded connection with the screw nut;
    a valve core component arranged in the valve chamber and comprising a valve core body and a lower stop component;
    wherein the valve core body is substantially tubular, the valve core body has an integral structure, and the valve core body comprises an annular thin-walled portion;
    the lower stop component is provided in an inner chamber of the valve core body, the lower stop component comprises a lower stop portion, an upper chamber is located above the lower stop portion, and a lower chamber is located below the lower stop portion, and the lower stop component comprises a first axial through hole communicating with the upper chamber and the lower chamber;
    the screw nut comprises a radial protrusion arranged in the upper chamber, the radial protrusion is configured to cooperate with an upper stop portion of the valve core component, and the screw nut is configured to drive the valve core component to move upward in an axial direction;
    the annular thin-walled portion is configured to abut against or be separated from a sealing portion of the valve seat component, and the lower stop portion is configured to cooperate with a lower end portion of the screw nut,
    the electric valve further comprises a valve core guiding component provided in the valve chamber, wherein the valve core guiding component comprises a guide sleeve, and the guide sleeve is fixedly connected with the valve body component;

the valve core body comprises a diameter-reduced section and a large-diameter section, a second axial through hole is provided between the diameter-reduced section and the large-diameter section, and the screw nut penetrates through the second axial through hole; an accommodating space is provided between an outer wall of the diameter-reduced section and an inner wall of the guide sleeve, a sealing assembly is provided in the accommodating space, and the sealing assembly is provided between the outer wall of the diameter-reduced section and the inner wall of the guide sleeve; and the outer wall of the large-diameter section is in sliding fit with the inner wall of the guide sleeve, a transition section is provided between the diameter-reduced section and the large-diameter section, the sealing assembly is arranged above the transition section, and a lower end surface of the transition section is configured to form the upper stop portion.

2. The electric valve according to claim 1, wherein the sealing assembly comprises a lower position-limiting member and an upper position-limiting member which are sleeved on an outer periphery of the diameter-reduced section, and a sealing component provided between the lower position-limiting member and the upper position-limiting member, the lower position-limiting member is hanged over at an upper end surface of the transition section, the upper position-limiting member is fixed to the diameter-reduced section by welding or an upper end portion of the diameter-reduced section is fixed to the upper position-limiting member by crimping, and the sealing component comprises an annular slide sheet and a sealing ring that is sleeved on an outer peripheral portion of the slide sheet.

3. The electric valve according to claim 1, wherein an inner wall of the large-diameter section comprises a first position-limiting stepped portion with a stepped surface facing downward, the lower stop component comprises a lower stop member abutting against the first position-limiting stepped portion, the lower stop member is fixed to the inner wall of the large-diameter section by welding, the lower stop member is provided with the first axial through hole, and an upper end surface of the lower stop member forms the lower stop portion.

4. The electric valve according to claim 3, wherein the screw nut further comprises a cylindrical lower extension, the lower extension comprises an accommodating cavity, at least part of the elastic member is arranged in the accommodating cavity, one end of the elastic member abuts against the screw nut, and another end of the elastic member abuts against the lower stop portion; when the annular thin-walled portion is separated from the sealing portion, an axial gap is present between a lower end of the lower extension and the lower stop portion; and after the annular thin-walled portion abuts against the sealing portion, the lower end of the lower extension abuts against the lower stop portion.

5. The electric valve according to claim 1, wherein the valve seat component comprises the valve seat body fixedly connected to the valve body component and a valve seat core fixedly connected to the valve seat body, the valve seat core is made of a plastic material, an upper end surface of the valve seat core forms the sealing portion, a lower end portion of the annular thin-walled portion has an arc structure, and a bottom end of the arc structure is configured to abut against or be separated from the sealing portion.

6. The electric valve according to claim 5, wherein the large-diameter section comprises a guide fitting section which is in sliding clearance fit with the guide sleeve and the annular thin-walled portion provided below the guide fitting section, an outer diameter of the annular thin-walled portion is greater than the outer diameter of the guide fitting section, an inner diameter of the annular thin-walled portion is greater than the inner diameter of the guide fitting section, and a projection of an outer wall of the guide fitting section in a horizontal direction substantially coincides with a circle line where the bottom end of the arc structure is located.

7. The electric valve according to claim 6, wherein a distance from an outer surface of the guide fitting section of the valve core body to an outer surface of the annular thin-walled portion is less than or equal to 0.5 mm.

8. The electric valve according to claim 1, wherein the valve seat component comprises the valve seat body fixedly connected to the valve body component and a valve seat core fixedly connected to the valve seat body, the valve seat core is made of a plastic material, an upper end surface of the valve seat core forms the sealing portion, a lower end portion of the annular thin-walled portion has a truncated cone structure with a larger upper part and a smaller lower part, a lower end surface of the truncated cone structure forms an annular sealing plane, and the annular sealing plane is configured to abut against or be separated from the sealing portion.

9. The electric valve according to claim 8, wherein the large-diameter section comprises a guide fitting section which is in sliding clearance fit with the guide sleeve and the annular thin-walled portion provided below the guide fitting section, an outer diameter of the annular thin-walled portion is greater than the outer diameter of the guide fitting section, an inner diameter of the annular thin-walled portion is greater than the inner diameter of the guide fitting section, and a projection of an outer wall of the guide fitting section in a horizontal direction substantially coincides with a center circle line of the annular sealing plane.

10. The electric valve according to claim 9, wherein a distance from an outer surface of the guide fitting section of the valve core body to an outer surface of the annular thin-walled portion is less than or equal to 0.5 mm.

11. The electric valve according to claim 1, wherein the valve core body comprises a guide fitting section and the annular thin-walled portion, the guide fitting section is in a straight tubular shape, the guide sleeve comprises a guide section and an installation section, inner walls of the guide section and the installation section are substantially cylindrical, an inner diameter of the guide section is less than the inner diameter of the installation section, an accommodating space is provided between the inner wall of the installation section and an outer wall of the guide fitting section, and a sealing assembly is provided in the accommodating space.

12. The electric valve according to claim 11, wherein the guide section and the installation section form a second position-limiting stepped portion with a stepped surface facing downward, the sealing assembly comprises a sealing component sleeved on an outer peripheral portion of the valve core body and a lower position-limiting member fixed to a lower end portion of the installation section by crimping or welding, and the sealing component is arranged between the second position-limiting stepped portion and the lower position-limiting member, and the sealing component comprises an annular slide sheet and a sealing ring that is sleeved on an outer peripheral portion of the slide sheet.

13. The electric valve according to claim 11, wherein the valve core component further comprises an upper stop member fixed to the valve core body by welding or crimping, a lower end surface of the upper stop member forms the upper stop portion, and the upper stop member comprises a second axial through hole in communication with the upper chamber; or, the valve core body comprises a transversely curved portion extending radially along an upper end of the valve core body, a lower end surface of the transversely curved portion serves as the upper stop portion, and the transversely curved portion comprises the second axial through hole in communication with the upper chamber.

14. The electric valve according to claim 11, wherein the valve seat component comprises the valve seat body fixedly connected to the valve body component and a valve seat core fixedly connected to the valve seat body, the valve seat core is made of a plastic material, an upper end surface of the valve seat core forms the sealing portion, a lower end portion of the annular thin-walled portion has an arc structure, and a bottom end of the arc structure is configured to abut against or be separated from the sealing portion.

15. The electric valve according to claim 12, wherein the valve seat component comprises the valve seat body fixedly connected to the valve body component and a valve seat core fixedly connected to the valve seat body, the valve seat core is made of a plastic material, an upper end surface of the valve seat core forms the sealing portion, a lower end portion of the annular thin-walled portion has a truncated cone structure with a larger upper part and a smaller lower part, a lower end surface of the truncated cone structure forms an annular sealing plane, and the annular sealing plane is configured to abut against or be separated from the sealing portion.

16. The electric valve according to claim 1, wherein the valve seat component comprises the valve seat body fixedly connected to the valve body component, and a valve seat core fixedly connected to the valve seat body, the valve seat component further comprises a valve port jacket, the valve port jacket is sleeved on the valve seat core, the valve port jacket comprises a cylinder portion cooperating with the valve seat core, an upper end portion of the valve port jacket is higher than the sealing portion in the axial direction, a shortest radial distance between an inner edge wall of the cylinder portion of the valve port jacket and a center circle line of a projection of the annular thin-walled portion in a horizontal direction is less than 2 mm.

* * * * *